United States Patent [19]

Gernandt

[11] 4,326,724
[45] Apr. 27, 1982

[54] PISTON AND SEAL ASSEMBLY

[75] Inventor: Helmut Gernandt, Cologne, Fed. Rep. of Germany

[73] Assignee: Linde Aktiengesellschaft, Wiesbaden, Fed. Rep. of Germany

[21] Appl. No.: 105,732

[22] Filed: Dec. 20, 1979

[30] Foreign Application Priority Data

Dec. 21, 1978 [DE] Fed. Rep. of Germany ....... 2855438

[51] Int. Cl.³ ............................ F16J 9/20; F16J 15/18
[52] U.S. Cl. ............................. 277/171; 277/DIG. 6
[58] Field of Search .................. 277/165, 171, DIG. 6

[56] References Cited

U.S. PATENT DOCUMENTS

| 2,186,020 | 1/1940 | Hall ........................................... 277/171 |
| 2,807,511 | 9/1957 | Fleming ................................. 277/Deg. 6 |
| 3,831,952 | 8/1974 | Geffroy .................................... 277/171 |

FOREIGN PATENT DOCUMENTS

| 2160816 | 6/1973 | Fed. Rep. of Germany |
| 284133 | 1/1978 | United Kingdom |
| 466718 | 6/1937 | United Kingdom . |
| 552296 | 3/1943 | United Kingdom . |

Primary Examiner—Robert I. Smith
Attorney, Agent, or Firm—Karl F. Ross

[57] ABSTRACT

A one-piece piston is formed with an outwardly open annular groove by machining in which a piston ring is received sealingly relative to the wall of a cylinder. According to the invention the flanks of the ring and the groove are formed as frustocones at least on one side of the ring. A support ring or backup ring may be provided between the piston ring and the other groove flank. The piston ring can be composed in whole or in part of a nonmetallic material such as polytetrafluoroethylene.

2 Claims, 6 Drawing Figures

PISTON AND SEAL ASSEMBLY

FIELD OF THE INVENTION

My present invention relates to a piston for a piston machine, especially a dry-running compressor, in which a seal is effected between the piston and the wall of the cylinder via a piston ring carried by the piston.

BACKGROUND OF THE INVENTION

Piston machines of a wide variety of types make use of piston rings to effect a seal between the piston and a wall of the cylinder in which the piston is reciprocable.

Of particular interest to the present invention are so-called dry-running pistons, i.e. pistons for use in gas machines, e.g. compressors, in which the piston ring effects a seal between a high-pressure side and a low-pressure side, the high-pressure side containing exclusively a gas phase. However, to the extent that the principles of the present invention are applicable to other piston machines, the invention should be understood as including these as well.

In general, when pistons are provided with piston rings the pistons can either be of a one-piece construction or multipart type. The latter construction is used when piston parts are assembled together with the rings to form a structure which is to be reciprocable in the cylinder.

When, however, a one-piece piston is provided, the or each piston ring is received in a respective groove which is machined in the periphery of the piston and can be biased outwardly by intrinsic stress or a separate element.

The piston ring usually has an annular shoulder, engaging an annular step on the piston to capture the ring in the piston.

For example, the piston described in the German patent document (open application—Offenlegungsschrift) DE-OS No. 21 60 826 comprises an outwardly stressed or urged piston ring which has a practically L-shaped cross-section, one leg of the L forming the strip which engages a cylindrical surface of the piston ring having generatrices parallel to the axis. This prevents the entire piston, after wear of the sliding surface, from escaping from the piston groove. When such contact between the lock of the piston ring and the abutment formed by the cylindrical surfaces of the piston contact one another, a wear-free labyrinth seal is provided.

A backing ring in the groove serves to fill part of the space within the groove behind the ring and to hold it against the abutment.

As a result of the clearances which are required between the groove, the piston ring and the backing ring, axial play is always present between these elements.

As a consequence of the axial play, relative movement of the piston and the rings is noticeable in the form of oscillation and impact-like contact of the piston ring with a flank of the groove. Particularly when the piston ring is a nonmetallic member this impact can be detrimental and, as the axial play increases, the danger of canting of the piston ring ensues which limits the sealing effectiveness of the assembly.

It is always expensive and time-consuming to replace such piston rings and to repair any damage to the groove. Frequently the deterioration is so great that the parts are irreplaceable. Finally, the machine may remain inoperative for long periods awaiting replacement of the defective parts.

OBJECTS OF THE INVENTION

It is the principal object of the present invention to provide a one-piece piston with a sealing-ring assembly which obviates the disadvantages of the earlier systems as mentioned above.

A more specific object of the invention is to provide a one-piece piston and a ring assembly therefor, especially for dry-running compressor pistons in which the axial play can be limited especially during the phases of operation in which the piston ring serves as a labyrinth seal.

Yet another object of my invention is to provide a ring-and-piston assembly whose seal is more durable and effective than earlier systems and which does not require as frequent replacement of parts as in the past.

SUMMARY OF THE INVENTION

These objects and others which will become apparent hereinafter are attained, in accordance with the present invention, in an assembly which comprises a one-piece piston formed with an outwardly open circumferential groove, a piston ring received in the groove, a backing or support ring disposed between the piston ring and a flank of the groove, and a cylinder in which the piston is slidable such that the piston ring forms, at least during part of the time, a labyrinth seal. According to the invention, a flank of the groove and a corresponding flank of the piston ring are of conical configuration, i.e. constitute frustoconical surfaces.

Advantageously, the complementary conical flanks or surfaces of ring and piston are in engagement when a substantial pressure differential is applied across the seal formed between the cylinder chambers separated by the piston ring. With the conical configuration, after the piston ring has been worn in, the two surfaces engage at a frustoconical interface or contact face and are held at least in part in contact by the outwardly directed stressing force intrinsic to the ring or applied by the spring ring in a wedge-like action. This wedge-type action is particularly effective because the conical surfaces ensure the maintenance of a radial force of the piston ring against the backing ring so that, during the operating phases in which the assembly acts as a labyrinth seal, there is practically no gap between the piston ring and the conical surfaces or flank of the groove, which is preferably immediately adjacent the mouth of the groove and the outer wall of the piston, and there is also no play or clearance between the rings; there is little, if any, axial play.

It has been found to be advantageous, moreover, to extend the conical flank of the annular shoulder of the groove substantially to the periphery of the piston. This has the further advantage that the depth of the annular groove can be kept comparatively small to minimize loss of strength of the piston. Machining of the groove, e.g. by turning devices such as lathes, is simplified.

The backing ring according to the invention can lie along the flank of the groove opposite the first conical surface and can be used in conjunction with an outwardly pressing ring urging the piston ring outwardly and/or with a piston ring having an intrinsic outward pressing force. With the assembly of the invention the piston is not significantly weakened because much shallower grooves can be used than has hitherto been the case.

The support ring can be a stress-free ring which can be set back from contact with the wall of the cylinder and which can be urged inwardly by the gross pressure differential between the cylinder running surface and the base or root of the groove. It also can be or include an inwardly stressed spring ring.

When the piston ring is subjected to high acceleration or inertial forces, it can be advantageous to provide the backing ring as an outwardly stressed spring ring and to provide an additional wedge action between the spring ring and the piston ring. This can be achieved by making the flank against which the backing ring is seated of frustoconical configuration and providing a frustoconical surface upon the backing ring. In this case, of course, the two frustoconical flanks of the groove are inclined toward one another away from the axis. The backing ring can have the frustoconical surface formed by the second flank of the groove can be of equal width but preferably is the full width or depth of the groove.

To enable the piston ring and backing ring to be set into the groove, the depth of the groove must be greater than the radial width of the piston ring, while the greatest axial width of the groove must be at least equal to the axial thickness of the piston ring plus the largest ring. Only in this case is it possible, after inserting the piston ring in the groove, to then insert the backing ring.

As with the piston ring, the support ring in this embodiment, because of the conical configuration of the groove flank against which it rests, is urged by the radially outward stressing force not only against the groove flank but also against the piston ring so that the two rings are forced together. When, as described, the groove flank for the support ring is frustoconical over the entire width of the groove, the support action for the piston ring is effective in all positions of the support ring.

Since during movement of the piston a relatively high pressure differential can develop between the root of the groove and the running surface of the cylinder, it is advantageous to provide the support ring or the piston ring or both with pressure-equalizing grooves at the confronting flanks. These grooves, regardless of the number in which they are formed, do not adversely affect the stability of the ring combination.

BRIEF DESCRIPTION OF THE DRAWING

The above and other objects, features and advantages of the invention will become more readily apparent from the following description, reference being made to the accompanying drawing in which.

SPECIFIC DESCRIPTION

Figure 1:
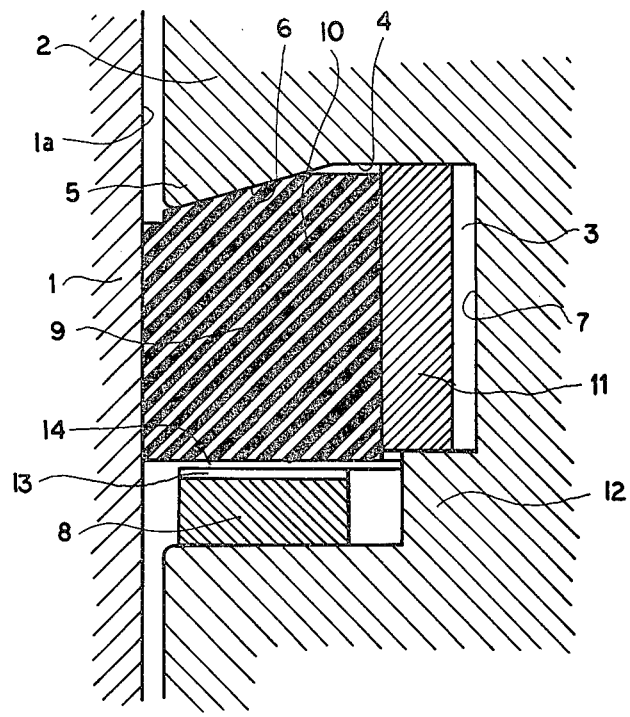
FIG. 1 is a section through a one-piece piston having an annular groove formed with a captured piston ring and an inwardly stressed support ring.
Figure 3:
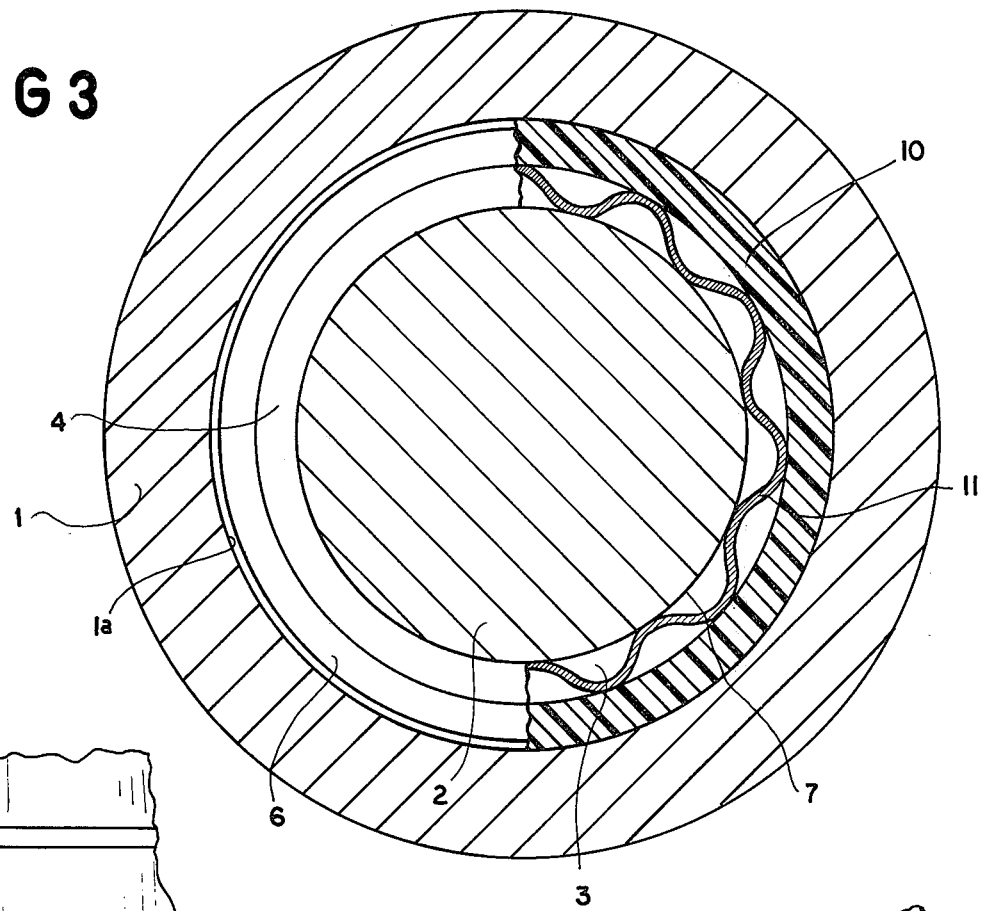
FIG. 3 is a section taken perpendicular to the axis of the piston in FIG. 1, showing at the left-hand side the conical flank of the groove and a section through the piston ring at the right-hand side.
Figure 6:
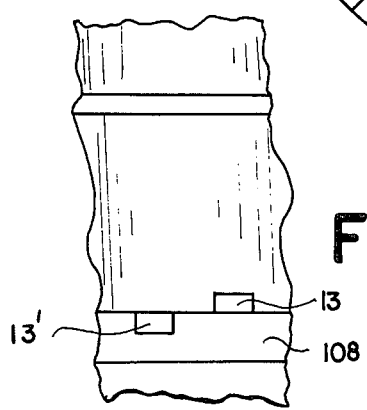
FIG. 6 is an elevational view of a portion of the ring assembly.
Figure 5:
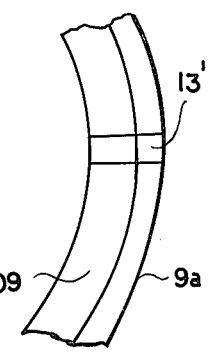
FIG. 5 is a bottom view of a portion of the piston ring in this embodiment.

FIGS. 1 and 3 I have shown a cylinder 1 provided with a one-piece piston 2 which is reciprocable within the cylinder and has a groove 3 machined in the piston and opened outwardly. Naturally, more than one such groove and respective ring assemblies can be provided for the piston which can be used for the purposes described in the publication mentioned previously as a dry-running compressor piston. The groove 3 has one axial lateral flank 4 directly adjacent the running surface 1a of the cylinder formed as an annular shoulder 5 which, in turn, has a frustoconical surface 6 turned toward the floor or root 7 of the groove.

The groove 3 also receives an inwardly stressed support or backing ring 8 and an unstressed piston ring 9 which can be composed of a nonmetallic low-friction material such as polytetrafluoroethylene.

The side of this piston ring turned away from the support ring 8 has an annular contact surface 10 with a frustoconical flank which is complementary to the flank 6.

Figure 4:
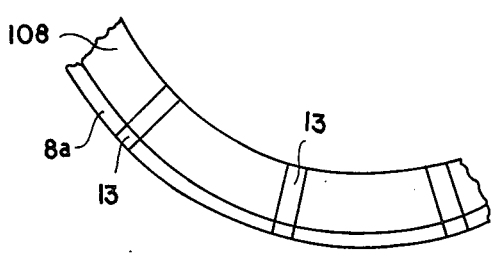
FIG. 4 is a top view of a portion of the support ring of FIG. 2.

In addition, between the floor 7 of the groove 3 and the inner surface of the piston ring 9, a spring ring 11 is provided which can be of wavy or undulating type (see member 11 in FIG. 3). This spring 11 urges the piston ring 9 radially outwardly against the running surface 1a of the cylinder. The spring ring 11, as shown in FIG. 1, can be guided on a step 12 of the floor 7 of the groove. For pressure equalization between the floor 7 and the surface 1a across which a significant gas pressure differential can develop, the support ring 8 is provided with at least one pressure-equalization groove 13 (compare FIG. 4).

The arrangement shown in FIG. 1 reveals the piston ring 9 in its working-in phase such that the piston ring 9 bears against the surface 1a and slight axial play 14 between the rings 8 and 9 remains.

However, as the surface of ring 9 wears away, this play progressively diminishes until the frustoconical surfaces force the piston ring not only into tight engagement with the groove flank 6 but also with the support ring 8. Thereafter, a wear-free labyrinth seal develops with no axial play.

The support ring 8 and the piston ring 9, depending upon the sealing requirement and the fluids subject to the compressor operation, can be either metallic or nonmetallic or a combination of both. For example, in both of the embodiments described, the piston ring can have a coating or layer of polytetrafluoroethylene applied to a metal ring, thereby reducing the sliding friction during the working-in phase. The piston ring may be intrinsically stressed outwardly by internal spring action, thereby eliminating the need for the spring ring 11.

Figure 2:
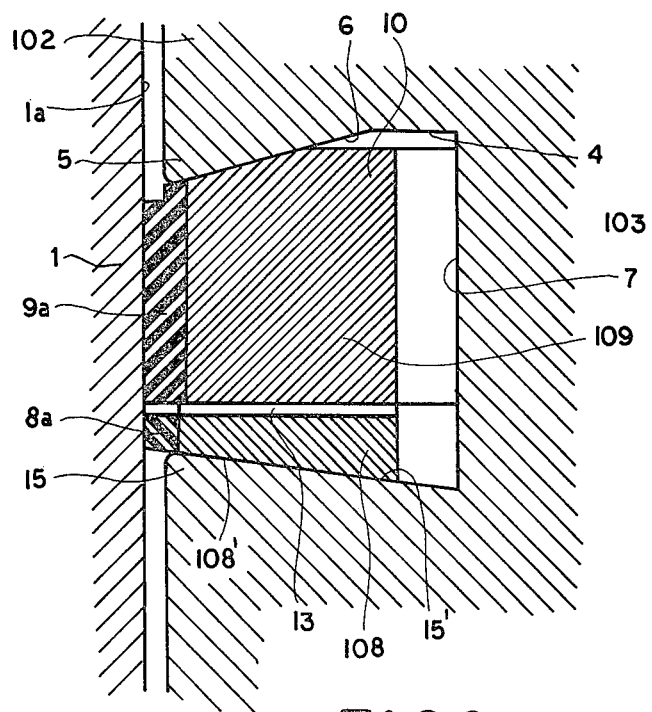
FIG. 2 is a similar view of a one-piece piston, a captured piston ring and an outwardly stressed support ring.

The embodiment of FIGS. 2 and 4 through 6 provides a support ring 108 and a piston ring 109 in a groove 103 of a one-piece piston 102. The support ring 108 is not inwardly stressed as in FIG. 1 but can be outwardly stressed and is formed over its entire width turned away from the piston ring 109 with a frustoconical surface 108' which is complementary to the frustoconical surface 15' formed by the annular shoulder 15. The support ring 108 is that of a width shaped in axial cross action. This has the advantage that, at the end of the working-in phase as shown in FIG. 2, the rings 108 and 109 are pressed tightly against one another and against the respective flanks of the groove to exclude axial play.

To reduce the friction forces during the working-in phase the support ring 8 is provided with a nonmetallic layer, e.g. of polytetrafluoroethylene 8a on its surface confronting the running surface 1a of the cylinder. A similar nonmetallic surface 9a is provided on the piston ring. In this case, the piston ring is self-expansive, i.e. intrinsically outwardly stressed so that a second spring ring is not necessary although one can be provided as was described in connection with FIG. 1.

To permit assembly of the ring system of FIG. 2, the depth of the groove 103 is greater than the radial width of the piston ring 109 and the greatest axial width of the groove is greater than the thickness of the piston ring 109 and the greatest thickness of the support ring 108. First the piston ring 109 is pressed downwardly into the groove 103 and slid along the conical flank 6 of shoulder 5 until the gap is sufficient to enable the support ring 108 to be inserted. When the two rings are in place, they are shifted radially to permit the piston to be inserted into the cylinder and, with wear of the larger portion of the piston ring during the working-in phase, axial play is eliminated.

I claim:
1. A piston-and-cylinder arrangement comprising:
   a cylinder forming a cylindrical running surface;
   a one-piece cylindrical piston axially reciprocatable in said cylinder and formed with an outwardly open circumferential groove, said groove having a cylindrical root surface spaced from the periphery of said piston by the depth of said groove and a pair of opposite axial flanks of frustoconical configuration defining a mouth of said groove at the periphery of said piston having an axial width less than the axial width of said root surface, the axial width of said groove being greatest at said root surface;
   a piston ring disposed in said groove and having a frustoconical flank complementary to and in engagement with one of said axial flanks of said groove along one axial side of said piston ring; and
   a support ring between the opposite axial side of said piston ring and the other axial flank of said groove, said rings being captive in said groove,
   said support ring having a first flank bearing against the other axial side of said piston ring and a second flank of frustoconical configuration complementary to and resting against said other flank of said groove,
   said other and second flanks being frustoconical over their entire widths,
   the depth of said groove being greater than the radial width of said piston ring and said groove having an axial width at said root surface at least equal to the maximum axial thickness of said piston ring plus the maximum thickness of said support ring and said other side of said piston ring forming juxtaposed mutually contacting surfaces, at least one of said juxtaposed surfaces being formed with at least one pressure equalizing groove extending generally radially and communicating between the region of said running surface and the region of said root surface of said circumferential groove.
2. The piston-and-cylinder arrangement defined in claim 1 wherein at least one of said rings is formed with a metal body having a nonmetallic outer layer engageable with said running surface.

* * * * *